United States Patent Office 3,258,071
Patented June 28, 1966

3,258,071
SECONDARY HYDROCARBON RECOVERY PROCESS
Chung Yu Shen, Olivette, and Darwin A. Novak, Jr., Overland, Mo., assignors to Monsanto Company, a corporation of Delaware
No Drawing. Filed Sept. 19, 1962, Ser. No. 224,844
10 Claims. (Cl. 166—9)

The present invention relates to the art of the secondary recovery of petroleum or other hydrocarbons from an underground hydrocarbon bearing formation by a water flooding method, and it more particularly relates to a novel method and novel compositions useful in practicing such art.

In recent years the practice of water flooding underground oil bearing formations to recover oil therefrom in the form of a water-oil mixture, from which the oil is subsequently separated, has become quite common in the case of formations from which the oil can no longer be recovered economically by primary recovery methods. However, many problems are encountered with the water flooding technique. In most instances the oil bearing formation is of such a nature that the formation is preferentially wetted by the oil and the water employed thus does not readily float away or remove the oil which is adsorbed on the surface of the pores and/or contained in crevices of the formation.

Also, in some instances, the water available for water flooding is moderately or highly saline (or of the nature of brine) and contains moderate to fairly high concentrations of dissolved salts, particularly sodium sulfate and/or sodium chloride. Saline water tends to suppress the solubility of various compounds such as sodium tripolyphosphate and sodium hexametaphosphate which have heretofore been suggested as additives to water floods to improve the yield of the oil recovered. This suppression of solubility decreases the effectiveness of such additives. In addition, saline water often contains various metallic compounds (e.g., metallic salts such as carbonates and bicarbonates in addition to chloride and sulfate) and tends to suppress the solubility of calcium, magnesium, iron and other metallic complexes of such phosphate compounds with the result that such complexes are often precipitated as finely divided particles or scales. These precipitates often cause restriction of flow and/or plugging of the input or injection well or the output or producing well, or of the oil bearing formation, or various combinations of these. This, in turn, results in decreased volume of oil recovered per unit of volume of water injected in the flooding operation.

The water flooding technique also presents problems in the case of relatively deep formations wherein the injection water may be heated by the ambient temperature of the formation to temperatures as high as 100 to 250° F. or possibly more. In such instances the linear or chain polyphosphate additives, such as sodium tripolyphosphate or sodium hexametaphosphate, degrade (hydrolyze) in a relatively short period of time, particularly when the water is recycled, to form orthophosphates, and these form precipitates with calcium, magnesium and iron ions. Such precipitates often cause the restriction of flow and plugging problems referred to above.

In view of these circumstances, there has been a need for an inexpensive inorganic additive to water employed in water floods, which additive will provide an increased yield of oil per unit of volume of water injected, and which will alleviate or eliminate at least some of the problems, referred to above, heretofore encountered in the use of linear or chain sodium tripolyphosphate or sodium hexametaphosphate.

It is, accordingly, one object of this invention to provide an inexpensive inorganic additive, not heretofore suggested for the purpose, for use in water flooding of hydrocarbon formations for secondary recovery of hydrocarbons from such formations.

It is another object of this invention to provide a relatively inexpensive water flooding medium in oil bearing formations, which medium will aid in improving the yield of oil recovered per unit of volume of water injected in the flooding operation.

It is a further object of this invention to provide a water flooding medium in hydrocarbon bearing formations, which medium enables one to alter the ability of the formation to be wetted by water and also enables one to inhibit or minimize precipitation of insoluble metal compounds in the medium.

Another object of this invention is to provide a novel saline or brine water flooding composition.

Still further objects and advantages of this invention will become apparent from the following description.

The present invention provides a novel saline or brine water flooding composition comprising natural saline or brine water containing sodium salts such as sodium sulfate and/or sodium chloride dissolved therein, and which may or may not contain other dissolved metallic salts or compounds, and an effective amount of an alkali trimetaphosphate, preferably sodium trimetaphosphate. The saline or brine water is one which occurs naturally (in nature) and may be obtained from a river, lake, pond, the ocean or even from artesian wells or from some similar source. As such it may, and usually does, contain, in addition to a sodium salt, varying amounts of one or more dissolved hardness imparting metallic salts or compounds such as calcium, magnesium, barium and other metal ions which impart "hardness" to the water. The term "hardness" refers to the presence of calcium and magnesium salts, or similar acting salts, in water which cause incrustations in boilers and heater treaters, and which form insoluble soap salts. The hardness of water is usually expressed in parts per million of $CaCO_3$ in water, and for natural saline or brine waters this hardness may vary from about 20 up to about 30,000 parts of $CaCO_3$ per million parts of water. However, in most instances the saline or brine water will have a hardness varying from about 50 up to about 4,000 parts per million.

Natural saline or brine water normally may be slightly acid, neutral or from slightly alkaline to moderately alkaline, and may have a pH in the range of about 5 to 9. More commonly, such water has a pH in the range of about 6 to 8 and this latter pH may be considered for most purposes to be neutral. Further, such water generally contains a sufficient quantity of bicarbonate ions to buffer the water which thus resists change in pH even though some acid or alkali is added to it.

In general, the salt content of a natural saline water may vary widely depending upon the source of the water, and may contain from small amounts of salts up to, including, and sometimes exceeding, the amount of salts in a saturated solution of salts. In most instances the salt content (other than the trimetaphosphate content) may vary from about 0.5% by weight or less up to about 50% by weight, but more commonly will vary from about 1% by weight up to about 25% by weight. In the case of natural brines, that is, natural water containing sodium chloride dissolved therein, the sodium chloride content may vary from about 1% by weight up to about 20% by weight, but is usually between about 1 and 10% by weight. One of the most likely available sources of water flooding operations near coastal hydrocarbon bearing formations is ocean or sea water which normally has a total solids content of about 3.4 to 3.8% by weight, and a sodium chloride content of about 2.4 to 2.8% by weight. The preferred natural saline waters are those substantially free of, or contain less than 5% (desirably less than 1%) by weight of, suspended insoluble solids or compounds.

The alkali trimetaphosphates employed in the novel saline water compositions or processes of this invention have the empirical formula: $M_3P_3O_9$, where at least one M is an alkali metal or ammonium and the other M's are hydrogen or ammonium or alkali metal, prefereably the latter. In contrast to sodium tripolyphosphate or sodium hexametaphosphate which are chain phosphates (having 3 P atoms and an average of about 6 P atoms, respectively, in the chain), such alkali trimetaphosphate is a ring or cyclic compound which may be represented by the following general structure:

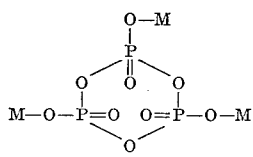

where at least one M is an alkali metal (such as Na, K, Li, Ce, etc.) or ammonium ($NH_4$) and the other M's are hydrogen, ammonium and/or an alkali metal, preferably an alkali metal. When all three M's are an alkali metal, it is preferable that the M's be identical, that is, all Na or all K, etc. Illustrative of compounds falling within the scope of the above structure, and which may be used in the compositions and processes of this invention are the following: trisodium trimetaphosphate or $Na_3P_3O_9$; disodium hydrogen trimetaphosphate or $Na_2HP_3O_9$; monosodium dihydrogen trimetaphosphate or $NaH_2P_3O_9$; tripotassium trimetaphosphate or $K_3P_3O_9$; dipotassium hydrogen trimetaphosphate or $K_2HP_3O_9$; monopotassium dihydrogen trimetaphosphate or $KH_2P_3O_9$; or the corresponding cesium, lithium or rubidium compounds or ammonium compounds, and the like. The preferred alkali trimetaphosphates are water soluble and have a solubility in distilled water in excess of 10% by weight at 25° C.

The preferred compound for use in this invention is trisodium trimetaphosphate (herein referred to for convenience as sodium trimetaphosphate) and this compound has a solubility of about 25.2 grams per 100 grams of water at 25° C.; a solubility at 25° C. of about 18 grams per 100 grams of a 5% solution of NaCl in water; and a solubility at 25° C. of about 5 grams per 100 grams of a 20% solution of NaCl in water. By way of contrast, sodium tripolyphosphate has a solubility at 25° C. of 15 grams per 100 grams of water; a solubility at 25° C. of 4 grams per 100 grams of a 5% solution of NaCl in water; and a solubility at 25° C. of 2 grams per 100 grams of a 20% NaCl water solution. These solubility figures are given to illustrate the significant difference in solubilities between a representative alkali trimetaphosphate and a representative alkali metal tripolyphosphate at temperatures at which water flooding media are normally injected into an input or injection well, and serve to illustrate why the trimetaphosphates have advantages (as will be explained more fully hereinafter) over the tripolyphosphates for water flooding purposes.

Unlike the chain or linear alkali metal tripolyphosphates or hexametaphosphates, however, the alkali trimetaphosphates are not sequestrants or metal ion-complexing agents and therefore, when incorporated in a water flood media, such trimetaphosphates do not initially sequester or complex the metal cations such as calcium, magnesium, iron, etc. cations. However, under the conditions existing in water flood media such trimetaphosphates convert or hydrolyze to form alkali tripolyphosphates or acid alkali tripolyphosphates which do act as sequestering or complexing agents, and other advantages (but not all of the disadvantages) attendant with the use of tripolyphosphates are obtained. Normally, the conversion or hydrolysis proceeds at a relatively slow rate. This provides a definite and controlled amount of tripolyphosphate in the media together with trimetaphosphate. The rate of conversion or hydrolysis of the trimetaphosphate to tripolyphosphates can be increased considerably to an almost or essentially instantaneous rate by the presence of alkalis in the flood water, the presence, for example, of two mols of NaOH per mol of trimetaphosphate giving almost an instantaneous rate of hydrolysis and quantitative yield of tripolyphosphate, with lesser amounts of alkali giving a fast rate initially but less complete instantaneous yield of tripolyphosphate. However, the addition of such alkali to the novel compositions of this invention is not necessary, and in most instances it is preferred to employ the trimetaphosphate in the water flood without incorporating alkali other than that which may be present in the natural saline water that is used.

In other instances, however, and particularly when it is beneficial to complex or sequester some of the "hardness" producing cations in the water, the addition of some alkali metal tripolyphosphate or alkali metal hexametaphosphate to the water flood media containing the trimetaphosphate may be beneficial, or this result can be achieved by adding small amounts of alkali, generally about 0.05 to about 1 mol of alkali per mol of the trimetaphosphate present in the water flood medium, thereby converting part of the trimetaphosphate to tripolyphosphate. In either case, the resulting water flood media will contain a mixture of alkali trimetaphosphate and alkali tripolyphosphate or hexametaphosphate depending on the procedure and ingredients used. As previously noted, such a mixture (with alkali metal tripolyphosphate) also is formed in the normal use of trimetaphosphate in the water media due to hydrolysis of the trimetaphosphate. Generally, it is satisfactory if the water flood contains at least 10% by weight of the trimetaphosphates based on the total phosphate content of the water. Near the end of the water flood treatment, the trimetaphosphate content may drop (due to hydrolysis) to essentially zero, and if the water obtained from the formation is recycled, sufficient amounts of the trimetaphosphate are incorporated in the water prior to reuse in the water flooding to give an initial concentration of at least 10% by weight of the trimetaphosphate based on the total phosphate content of the water.

The total amount of the trimetaphosphate initially incorporated in the water medium may vary to a considerable extent depending upon the nature of the saline water used, the formation treated and other factors hereinbefore referred to. In general, amounts of in excess of 5 parts of the trimetaphosphate per million parts of water will be beneficial, but excessive amounts should be avoided. In most instances, a suitable range is about 10 to 400 parts per million parts of water, and a preferred range is about 20 to 250 parts of the trimetaphosphate per million parts of water.

In carrying out the processes of this invention, it is not essential to use the novel saline water compositions hereinbefore described since it is also possible to use water floods containing the trimetaphosphate and artificial saline or brine water, or pure or relatively pure water. By "relatively pure water" is meant water which contains only small amounts of salts and which may or may not contain small amounts of suspended solids. In any event, the water used preferably is substantially free of suspended or insoluble solids, or contains less than 5% (desirably less than 1%) by weight of such solids.

The water, which is usually at ambient temperatures, for example, temperatures of about 40 to about 80° F., can be injected into the hydrocarbon-bearing formation by any of the techniques now or hereafter used in this art, and which are suitable or obviously suitable in the practice of the present invention. In general, such techniques involve the use of one or more output or producing wells and input or injection wells or a common injection and producing well. The output or producing well is the well from which the water-hydrocarbon mixture is recovered by the usual procedures. The input or injection well is the well through which the water flood medium is injected into the hydrocarbon- bearing formation through which the water passes or permeates until it reaches the output well. The number and location of input and output wells employed in water flooding of hydrocarbon bearing formations will vary considerably with the particular formation treated, the depth of the formation and other factors which will be apparent to those skilled in this art. Therefore, the particular technique used constitutes only an incidental rather than an essential aspect of the processes of the present invention.

In the practice of water flooding, it is also a customary procedure to inject the water flood medium into the formation under pressure, and such practice is included in the processes of the present invention. For example, it is customary to inject the water medium into the formation using a pressure which is at least sufficient to enable the water medium to penetrate through the formation from the input well to the output well. However, it is desirable to avoid pressures that are sufficiently high to cause the formation of channels through which the water medium flows with little resistance, and thus fails to displace or flush the hydrocarbon from a substantial volume of the formation. It is therefore seen that the water pressure used may vary widely depending on such factors as the nature and structure of the formation, the location of injection wells and production wells, the amount and distribution of hydrocarbon in the formation, and other factors. In some instances, it may not even be necessary to inject the water under pressure greater than that provided by the hydrostatic head of water in the injection well. However, in a number of situations additional pressure may be required and generally a pressure in the range of about 100 to 1200 pounds per square inch gauge (p.s.i.g.), preferably about 600 to 1000 p.s.i.g., will give satisfactory results. This may be accomplished, for example, by supplying the water medium, to be injected, to a compressor or pump where its pressure may be raised to the order of pressures set forth above, after which the water medium from the compressor passes through pipes by way of a head into an injection well which conducts the water medium into the subterranean hydrocarbon or oil strata or formations. Of course, the water medium may be injected under pressure into such strata or formations in other ways or using different procedures.

In any event, the injected water medium passes through the hydrocarbon and/or oil strata or formation driving out or carrying with it hydrocarbons removed by the water medium from such strata or formation, and the resulting effluent from the strata or formations enters the production well or wells. The effluent is then removed from such production well, for example, through a head by valved pipes and may then be worked up in a separating stage of the process. For example, in the separating stage, the effluent (of water medium and hydrocarbons) can be passed into a separator where separation is made between the liquids and gases in the effluent, and the resulting liquid comprising a water-liquid hydrocarbon mixture is subsequently subjected to a separating process, for example, settling followed by removal of the liquid hydrocarbon upper layer from the lower aqueous layer. This latter separation step may be assisted, if necessary, by the use of defoamers, deemulsifying agents and the like in the event that ready separation into two distinct layers is prevented or inhibited due to the presence in the hydrocarbon or water, or both, of agents which cause emulsification or other separation problems.

The separated gases and hydrocarbon may be handled and used in a manner customarily employed in the art, and may be partially dried or completely dried, if necessary, prior to or in the course of such handling or use. The water layer is preferably recycled or reused for water flooding of the same formation or adjacent formation in combination with the alkali trimetaphosphate. However, it may be dumped or otherwise disposed of if there is sufficient previously unused water available for water flooding and/or if the water recovered from the water flooding operation is too contaminated with minerals (scale forming or precipitants or otherwise) or other contaminants so as to make further use thereof for water flooding undesirable or impractical. Normally, however, unless the water medium dissolves a considerable quantity of minerals or mixes with connate water containing such minerals in its passage through a subterranean strata or formation, the water medium may be reused or recycled through the same or an adjacent strata or formation for secondary hydrocarbon recovery purposes.

In practicing the processes of this invention, the water medium (whether pure, relatively pure or saline water) employed initially contains an alkali trimetaphosphate, as previously noted herein. The trimetaphosphate may be incorporated into the water medium at any stage prior to contact of the water medium with the strata or formation to be flooded. For example, the trimetaphosphate may be added to the water medium above ground prior to introducing the water into an injection well or the trimetaphosphate may be incorporated in the water medium in the injection well or the trimetaphosphate may be incorporated in the water medium just prior to contacting with or injecting the water medium into the strata or formation. From this, it will be seen that it is not essential that the water medium contain the trimetaphosphate as such at the time it begins its passage through the formation or strata since hydrolysis or conversion of the trimetaphosphate to tripolyphosphate may occur before the water medium actually contacts the strata or formation and, in such instances, the advantages and objectives of the invention are still achieved. However, because of the advantages hereinbefore referred to in the description of this invention and disadvantages encountered and hereinbefore referred to in using chain tripolyphosphates (such as sodium tripolyphosphate), it is preferred that the water medium contacting and passing through the strata or formation contain some of the alkali trimetaphosphate, albeit in small quantities, of the order of at least 5% by weight of the total phosphate content of the water medium contacting and passing through the strata or formation.

The water flood medium of this invention, or the medium employed in carrying out the processes of this invention, may contain other additives in addition to the alkali trimetaphosphates or combinations thereof with chain or linear polyphosphates, preferably chain or linear polyphosphate sequestrants or chelates, such as sodium tripolyphosphate, sodium hexametaphosphate and/or other chain glassy polyphosphates. Such other additives may include, for example, agents such as surface tension depressants, for instance, surface-active nonionic or anionic wetting agents- nonphosphate sequestrants such as organic polyacids; dissolved or undissolved gases such a $CO_2$, nitrogen, etc. which aid in enhancing the drive or pressure of the water flood medium through the hydrocarbon strata or formation; foam depressants such as silicone oils; and/or emulsion resolving or emulsion breaking agents such as those presently used in the petroleum art.

A large variety of surface tension depressant or surface active nonionic wetting agents may be used in the water flood medium including, but not limited to, condensation products of an alkylene oxide, preferably of 2-4 carbon atoms, employed in any sequence, with organic compounds (preferably of a hydrophobic nature) having one or more reactive hydrogen atoms, for instance, organic compounds such as monohydric alcohols, dihydric alcohols, phenols, alkyl phenols, mercaptans, monoamines, di-amines, or the like. For example, the various nonionic agents described in U.S. Patent No. 2,846,398, issued August 5, 1958, particularly those described in column 5, lines 41–74, of that patent, may be used, as well as nonionic wetting agents described in Schwartz and Perry, "Surface Active Agents," Interscience Publishers, New York (1949); and Journal American Oil Chemists Society, volume 34, No. 4, pages 170–216 (April 1957). The preferred nonionic agents are those which are water soluble or are soluble in water to the extent of 0.1% by weight or more, although nonionic wetting agents which are water soluble and oil soluble are, in many instances, essentially as suitable.

Illustrative of anionic wetting agents which may be used in the water flood medium are the sulfated and sulphonated alkyl, aryl and alkyl aryl hydrocarbons described in the above-mentioned U.S. Patent No. 2,846,398, particularly those described in column 4, lines 35–75 and column 5, lines 1–6, of that patent. Other examples of anionic wetting agents which may be used include those described in the Schwartz and Perry and Journal American Oil Chemists Society publications referred to in the preceding paragraph. The preferred anionic agents are those which are water soluble or are soluble in water to the extent of 0.1% by weight or more, although anionic wetting agents which are water soluble and oil soluble are, in many instances, essentially as suitable.

In order to avoid unnecessary enlargement of this specification, the subject matter relating to anionic and nonionic wetting agents set forth in the above-referred-to publications is incorporated herein by reference. It is also to be understood that nonionic and anionic wetting agents other than those described in these publications may be used in the water flood medium.

Examples of non-phosphate sequestering agents which may be used in the water flood medium include, but are not limited to, amino monocarboxylic acids such as glycine, N-N-di(2-hydroxyethyl) glycine and the like; and organic polyacids, preferably polycarboxylic acids such as, for example, citric acid, tartaric acid and the like and amino polyacids, preferably amino polycarboxylic acids, such as nitrilotriacetic acid; ethylene diamine tetracetic acid, (hydroxyethyl) ethylene diamine triacetic acid, di(o-hydroxyphenyl) ethylene diamine diacetic acid and the like, and alkali metal salts of such acids.

A large variety of emulsion resolving or emulsion breaking agents may be used in the water flood medium, including those heretofore used in the petroleum art. Such agents include oxyethylation-susceptible, fusible, organic solvent-soluble, water-insoluble low stage phenol-aldehyde resins such as the products described in U.S. Patent No. 2,542,008 of Melvin De Groote et al. issued February 20, 1951; polycarboxy acid esters of oxypropylated amines such as the esters described in U.S. Patent No. 2,679,510 of Melvin De Groote issued May 25, 1954; oxypropylated esters of polycarboxylic acids such as the esters described in U.S. Patent No. 2,679,521 of Melvin De Groote issued May 25, 1954; hydrophile products obtained by reaction between a polycarboxy acid and highly oxypropylated substituted ring compounds having N and C atoms in the ring, for example, hydrophile products such as described in U.S. Patent No. 2,695,884 of Alvin H. Howard issued November 30, 1954; and the like.

The water flood media of this invention or those used in the processes of this invention may contain additives in addition to or instead of (with the exception of the alkali trimetaphosphates) those previously described herein, but it is preferred that any additive used should not diminish the effectiveness of the water flood medium containing the alkali trimetaphosphate for the recovery of hydrocarbons from underground formations containing such hydrocarbons. Many additives have been disclosed for use in water flooding oil formations, as will be apparent to those skilled in this art, and such additive may be used (in quantities normally employed), when appropriate, in the compositions and processes of this invention.

The water flooding processes of this invention may be utilized in the recovery of hydrocarbons from a large variety of subterranean hydrocarbon formations susceptible to water flooding techniques. For example, such formations may include fine grained or porous rock formations containing oil, sandstone formations containing oil, oil bearing sand formations and the like. However, it is possible to utilize the processes of this invention for the recovery of hydrocarbons from subterranean formations which are initially oil wet, that is, are preferentially wetted by oil rather than water. In the case of such oil wet formations, it is possible by using a water flood containing an alkali trimetaphosphate to change the properties or nature of the formations so that they become water wet by means of such trimetaphosphate per se as is shown in Example I, that is, the formations are preferentially wetted by water rather than oil. Theoretically at least the recovery of oil from water wet formations should be enhanced by a water flood technique since in such instances it should be possible for the water layer or film of the flood to come into intimate, surface to surface contact with the rock or sand surfaces of the formation and flush away or remove the hydrocarbon, for example, oil, adhering to such rock or sand surfaces with the result that more hydrocarbon is contained in the water flood than would normally be the case than in a water flood acting on an oil wet formation. However, in actual practice with other water flood media it has not been possible to definitely correlate this theoretical consideration with results obtained on a practical test.

A number of tests have been suggested, for use on small scale samples of a rock or sand formation known to exist in a formation to which it may be desired to apply a water flood technique, to aid in determining whether the particular injection water to be used in a water flooding operation may be used successfully in such formation for secondary hydrocarbon recovery. One of these tests is designed to measure the ability of the injection water to permeate the formation without plugging the small pores and crevices therein, and such test may be referred to as the "Millipore Water Quality Test." This test is described in an article by T. M. Doscher and L. Weber entitled, "The Membrane Filter in Determining Quality of Water for Surface Injection," in Producers Monthly, volume 21, No. 6, pages 33–42, June (1957), and an article by Charles C. Wright entitled, "Water Quality and Corrosion Control for Subsurface Injection," in American Petroleum Institute Drilling and Production Practice, pages 134–139 (1960). Another test is designed to measure the ability of the injection water to wet the rock or sand surfaces of the formation and thus the ability of the water to change such formation from one that is initially oil wet to one that is water wet, and such test may be referred to as a "Capillarimetric Test." This test is described in an article by F. E. Bartell and F. L. Miller entitled, "A Method for the Measurement of Interfacial Tension of Liquid-Liquid Systems," in J.A.C.S., volume 50, pages 1961–1967, July (1928), and an article by R. T. Johansen and H. N. Dunning entitled, "Relative Wetting Tendencies of Crude Oils by Capillarimetric Method," in Bureau of Mines Report of Investigations 5742 (1961).

Although the results obtained on samples from the formation by the two tests referred to in the preceding paragraph do not necessarily correlate with actual field tests of an underground formation and do not enable a definite prediction that a particular water flood medium will enhance the recovery of oil or other hydrocarbons from a subterranean formation, nevertheless such tests do indicate whether a particular water flood medium may be more successful than another in a water flooding operation for the enhanced recovery of hydrocarbons.

A further understanding of the compositions and processes of this invention may be obtained from the following specific examples which are intended to further illustrate the invention but not to limit the scope thereof, parts and percentages being by weight unless otherwise specified.

Example I

Samples of a natural saline water and produced crude oil available in Pecos County, Texas, were used in this experiment. The water had a pH of 7.1 and contained 10,600 parts per million of total solids, including dissolved sodium chloride, and 3,300 parts per million of total hardness, due primarily to calcium and magnesium salts, as calcium carbonate. The water sample per se was subjected to the Millipore Water Quality Test and both the oil and water samples per se were subjected to the Capillarimeter Test, previously referred to in this specification. It was found that the filtration rate (gallons/hour, sq. ft., p.s.i.g.) of the water per se was 66.58, using a pressure of 0.5 p.s.i.g. in carrying out the test, and the water-wettability of the oil-water system per se as measured by displacement energy (ergs/cm.$^2$) was 25.73. Three separate samples of the same water to which had been added sodium trimetaphosphate (trisodium trimetaphosphate) in amounts sufficient to provide a concentration of 25, 50 and 100 parts per million, respectively, of such phosphate in the water samples were tested on oil samples from the same formations in the same manner as the water per se system and the oil-water system per se. Table 1, which follows, shows the results of these tests.

TABLE 1

| Saline water containing amounts of sodium trimetaphosphate indicated below | Capillarimetric Test Displacement Energy, ergs/cm.$^2$ | Millipore Water Quality Test Filtration Rate, Gallons, hr., ft.$^2$/p.s.i.g. |
| --- | --- | --- |
| 25 p.p.m. | 29.40 | 71.11 |
| 50 p.p.m. | 26.37 | 71.64 |
| 100 p.p.m. | 24.00 | 69.72 |

The above-referred-to results show that the crude oil in contact with the water containing 25 p.p.m. of sodium trimetaphosphate gives a 16.1% increase over the crude oil in contact with the water per se by the Capillarimetric Test, and the saline water containing 50 p.p.m. of sodium trimetaphosphate gives a 7.6% increase over the saline water per se by the Millipore Water Quality Test. From these results, it can also be concluded that the best concentration of sodium trimetaphosphate to be used in this particular water for water flooding the formation would be about 25 p.p.m. since good results are obtained at this concentration level for both tests as compared to the results obtained at the other concentration levels.

By way of contrast, a similar saline water to which various amounts of sodium tripolyphosphate had been added was subjected to the same tests. These tests showed that it was necessary to use a concentration of 50 p.p.m. of sodium tripolyphasphate in order to obtain results comparable to the results obtained with 25 p.p.m. of sodium trimetaphosphate.

It was also determined that the water could tolerate a concentration of 320 p.p.m. of sodium trimetaphosphate without becoming turbid, whereas the water could only tolerate a concentration of 210 p.p.m. of sodium tripolyphosphate before coming turbid. Since turbidity indicates the formation of suspended solids which could plug this formation during water flooding, it can be seen that a much higher concentration of sodium trimetaphosphate can be present in the water than in the case of sodium tripolyphosphate without producing plugging effects during water flooding of this formation with this particular water.

Example II

On oil bearing sandstone reservoir approximately 700 to 1,000 feet below ground surface, located near Dewey, Oklahoma, and having a total of 28 injection and production wells (arranged, except for 3 extra injection wells, in a 5 spot manner) had been water flooded for several years prior to the treatment hereinafter described. Just prior to the start of this treatment, the injectivity (that is, he ratio of barrels per day of injected water to pounds per square inch gauge pressure required to inject water in the injection wells) of this reservoir was about 0.4. The injection water employed had substantially the same composition as that described in the first sentence of Example I. In carrying out the process of this invention, the injection water previously used was modified by dissolving 25 p.p.m. of sodium trimetaphosphate in the water and the reservoir was flooded through the injection wells with the resultant water over a 9-month period with recycle of the water recovered from the production wells using additional sodium trimetaphosphate as required to maintain the 25 p.p.m. concentration. Shortly after the sodium trimetaphosphate containing water was employed as the injection water, the injectivity rose to 0.5 and nine months later the injectivity rose to 0.9. Thus, the reservoir was flooded with a greater volume of water using the same water pressure on the input or injection wells than was possible with the use of the water per se, and this resulted in a greater percentage of oil recovered per day than was possible with the use of the water per se.

Example III

The water flooding operation described in Example II was continued with beneficial results using a water flood containing about 15 p.p.m. of sodium trimetaphosphate and about 5 p.p.m. of sodium tripolyphosphate. This concentration of sodium tripolyphosphate is below the concentration at which beneficial results have been obtained in past water flooding operations using water floods containing sodium tripolyphosphate per se.

Results obtained by the processes of this invention indicate that water flood media containing an alkali trimetaphosphate are considerably more beneficial than water flood media containing sodium tripolyphosphate per se in the water flooding of relatively deep reservoirs wherein the temperature of the water will increase to 100° F. or more. Apparently, under such conditions the sodium tripolyphosphate in the water floods degrades or hydrolyzes to less beneficial, and often harmful, orthophosphates, whereas the alkali trimetaphosphate in the injection water is converted or hydrolyzed to alkali tripolyphosphate. This means that when trimetaphosphate is used, part of it is in solution functioning to make an oil-wet formation water-wet, part of it is being hydrolyzed to tripolyphosphate which acts to sequester metal ions being picked up as the water flood moves through a formation and only a small part is being converted to orthophosphate at any point in time. Both the alkali trimetaphosphate used and the tripolyphosphate, to which it is converted during use, are beneficial ingredients in the water flood medium.

What is claimed is:

1. In a process of recovering hydrocarbons from a subterranean, oil-wet formation containing hydrocarbons by means of a water flooding operation the improvement which comprises injecting into said oil-wet formation a water flooding medium having a pH in the range of about 5 to 9 and containing an amount of alkali trimetaphosphate sufficient to change the oil-wet formation to a water-wet formation by the passage of said medium through said formation.

2. In a process of recovering liquid petroleum materials from a subterranean, oil-wet formation containing said materials by means of a water flooding operation the improvement which comprises injecting into said oil-wet formation a water flooding medium having a pH in the range of about 5 to 9 and containing an effective amount within the range of about 10 to 400 parts of trisodium trimetaphosphate per million parts of water in said medium.

3. A process as in claim 2, wherein the water flood medium is a natural saline water.

4. A process as in claim 3, wherein the water flood medium has a pH in the range of about 5 to 9, a hardness of about 50 to about 4,000 parts per million, calculated as $CaCO_3$, and a sodium chloride content in the range of about 1 to 10% by weight.

5. A process as in claim 4, wherein the water flood medium also contains a chain polyphosphate capable of sequestering cations causing hardness in water, and at least 10% of the total phosphate content of the water flood medium is trisodium trimetaphosphate.

6. A process as in claim 2, wherein the water flood medium also contains an effective amount of a surface tension depressant.

7. A process as in claim 2, wherein the water flood medium also contains an effective amount of an organic sequestrant.

8. A process as in claim 2, wherein the formation is at such a depth that the water flood medium attains a temperature of 100–250° F. during its passage through the formation.

9. In a process of recovering oil from oil-wet formation containing oil bearing sands or sandstone by means of a water flooding operation involving the use of separate injection and production wells, the improvement which comprises injecting into and flooding said oil-wet formation with natural saline water containing an effective amount of trisodium trimetaphosphate in the range of about 20 to 250 parts per million parts of water, said water initially having a pH of about 6 to about 8, a hardness, calculated as $CaCO_3$, of about 50 to about 4,000 parts per million, and a sodium chloride content of about 1 to about 10% by weight, said water being injected under pressure into said injection wells and recovered, together with oil, from said production wells.

10. A process as in claim 9, wherein the formation to be flooded is at a depth such that the water injected into the input wells at a temperature of about 40 to about 70° F. is heated to a temperature of about 100 to 250° F. during its passage through the formation.

References Cited by the Examiner
UNITED STATES PATENTS

| | | |
|---|---|---|
| 2,238,930 | 4/1941 | Chamberlain et al. |
| 2,341,500 | 2/1944 | Detling _____ 166—42 X |
| 2,802,784 | 8/1957 | Nowak et al. _____ 166—42 X |

OTHER REFERENCES

Holbrook et al., "Source and Purification of Water Supply," Secondary Recovery of Oil in the United States, published by American Petroleum Institute, 1950, New York, N.Y., pp. 301–306.

Van Wazer, J. R., Phosphorus and Its Compounds, Interscience Publishers Inc., 1958, New York, pp. 456 and 460–461.

The Condensed Chemical Dictionary, Sixth Edition, 1961, Reinhold Publishing Corp., New York, pp. 1045 and 1046.

JACOB L. NACKENOFF, *Primary Examiner.*

CHARLES E. O'CONNELL, *Examiner.*

T. A. ZALENSKI, *Assistant Examiner.*